(12) United States Patent
Pan et al.

(10) Patent No.: US 9,018,798 B2
(45) Date of Patent: Apr. 28, 2015

(54) POWER SUPPLY CIRCUIT

(71) Applicants: Ya-Jun Pan, Shenzhen (CN); Ting Ge, Shenzhen (CN)

(72) Inventors: Ya-Jun Pan, Shenzhen (CN); Ting Ge, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 303 days.

(21) Appl. No.: 13/650,168

(22) Filed: Oct. 12, 2012

(65) Prior Publication Data

US 2013/0249291 A1    Sep. 26, 2013

(30) Foreign Application Priority Data

Mar. 23, 2012    (CN) .......................... 2012 1 0079030

(51) Int. Cl.
*H02J 1/00*    (2006.01)
*G06F 1/28*    (2006.01)
*H02H 3/20*    (2006.01)
*G06F 1/30*    (2006.01)

(52) U.S. Cl.
CPC ................. *G06F 1/28* (2013.01); *H02H 3/202* (2013.01); *G06F 1/30* (2013.01)

(58) Field of Classification Search
CPC .... G11C 5/147; G11C 11/1697; G11C 5/143; G11C 7/062; G11C 7/06; H02J 1/00; H02J 3/005; H02J 2009/068
USPC ........... 307/530; 361/235, 601; 713/300, 340; 327/530
See application file for complete search history.

(56) References Cited

U.S. PATENT DOCUMENTS

| | | | |
|---|---|---|---|
| 7,362,161 B2* | 4/2008 | Sone ............................. | 327/530 |
| 2002/0047045 A1* | 4/2002 | Song et al. .................... | 235/441 |
| 2008/0144241 A1* | 6/2008 | Crawley et al. ................ | 361/56 |

* cited by examiner

*Primary Examiner* — Rexford Barnie
*Assistant Examiner* — Soheil Shahami
(74) *Attorney, Agent, or Firm* — Novak Druce Connolly Bove + Quigg LLP

(57) ABSTRACT

A power supply circuit includes a comparator, first to third electronic switches, a D-trigger, a power supply unit (PSU), and a complex programmable logic device (CPLD). When a voltage from the PSU is greater than a reference voltage, the first electronic switch is turned on. An electronic device connected to the first electronic does not receive power from the PSU. The second electronic switch is turned on. The third electronic switch is turned off. The D-trigger outputs a low level signal to make the CPLD control the PSU stop supplying power.

6 Claims, 2 Drawing Sheets

POWER SUPPLY CIRCUIT

BACKGROUND

1. Technical Field

The present disclosure relates to a power supply circuit.

2. Description of Related Art

Referring to FIG. 2, a power supply circuit for a central processing unit (CPU) is shown. In the power supply circuit, when a metal oxide semiconductor field effect transistor (MOSFET) Q is not operating, an input voltage VIN is transmitted to the CPU through a drain and a source of the MOSFET Q, and an inductor L directly. As a result, the input voltage VIN cannot be monitored, and any problems, such as spikes in VIN, could damage the CPU.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
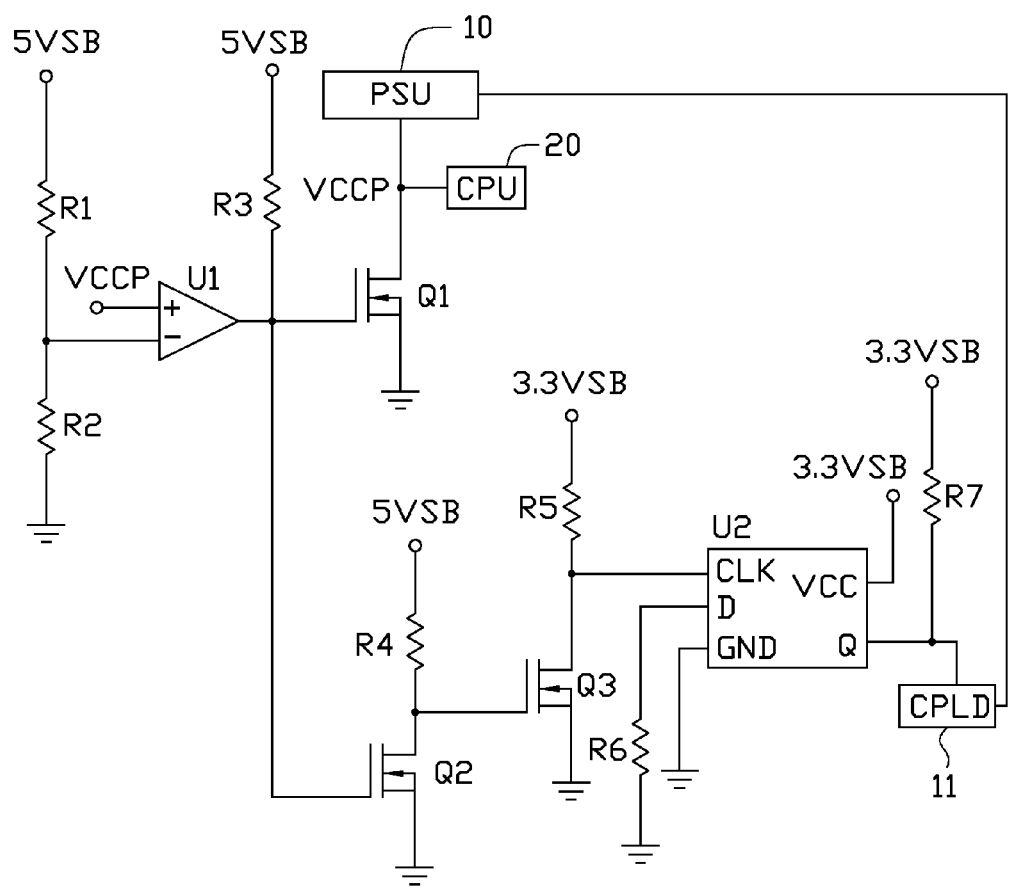
FIG. 1 is a circuit diagram of an embodiment of a power supply circuit.
Figure 2:
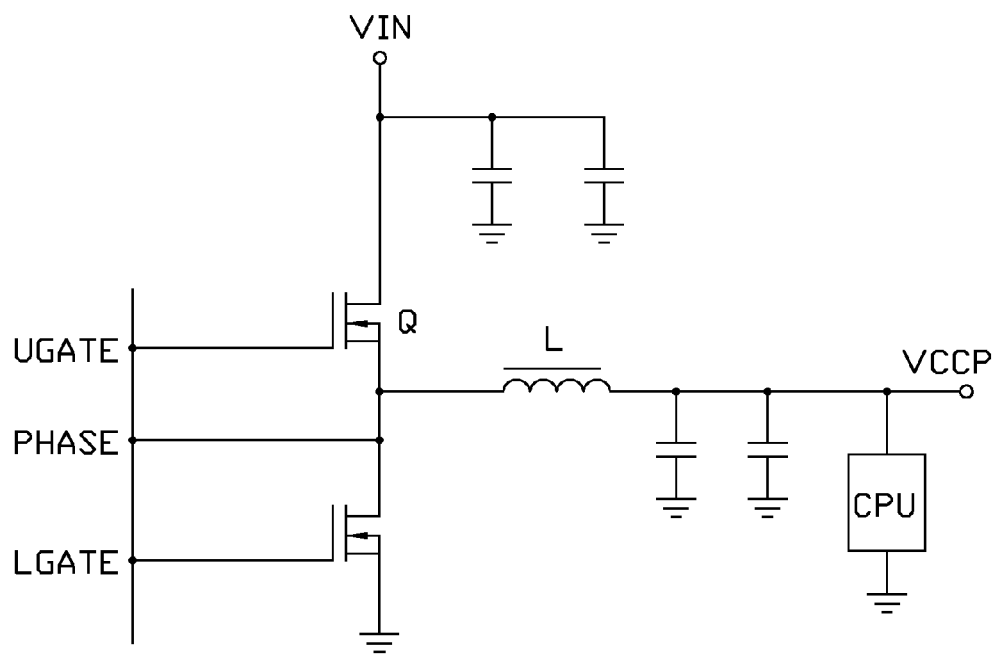
FIG. 2 is a circuit diagram of a power supply circuit of a related art.

Referring to FIG. 1, an embodiment of a power supply circuit includes a comparator U1, metal oxide semiconductor field effect transistors (MOSFETs) Q1, Q2, and Q3, a D-trigger U2, resistors R1-R7, a power supply unit (PSU) 10, and a complex programmable logic device (CPLD) 11. In the embodiment, the power supply circuit supplies power for a central processing unit (CPU) 20.

A first standby voltage 5 VSB is grounded through the resistors R1 and R2 connected in series. A node between the resistors R1 and R2 is connected to a negative input of the comparator U1. A positive input of the comparator U1 is connected to the PSU 10 for receiving a voltage VCCP. An output of the comparator U1 is connected to a gate of the MOSFET Q1. The gate of the MOSFET Q1 is further connected to the first standby voltage 5 VSB through the resistor R3. A drain of the MOSFET Q1 is connected to the PSU 10 for receiving the voltage VCCP. A source of the MOSFET Q1 is grounded.

A gate of the MOSFET Q2 is connected to the output of the comparator U1. A source of the MOSFET Q2 is grounded. A drain of the MOSFET Q2 is connected to the first standby voltage 5 VSB through the resistor R4. The drain of the MOSFET Q2 is further connected to a gate of the MOSFET Q3. A source of the MOSFET Q3 is grounded. A drain of the MOSFET Q3 is connected to a second standby voltage 3.3 VSB through the resistor R5.

A data input pin D of the D-trigger U2 is grounded through the resistor R6. A clock pin CLK of the D-trigger U2 is connected to the drain of the MOSFET Q3. A ground pin GND of the D-trigger U2 is grounded. A power pin VCC of the D-trigger U2 is connected to the second standby voltage 3.3 VSB. An output pin Q of the D-trigger U2 is connected to the CPLD 11. The CPLD 11 is further connected to the PSU 10 for controlling the PSU 10.

In the embodiment, resistances of the resistors R1 and R2 are set to make a voltage at the node between the resistors R1 and R2 equal to a maximum working voltage (VCPPmax) of the CPU 20.

When the voltage VCCP from the PSU 10 is not greater than the maximum working voltage VCPPmax, the comparator U1 outputs a low level signal. The MOSFET Q1 is turned off. The voltage VCCP is transmitted to the CPU 20. The MOSFET Q2 is turned off. The MOSFET Q3 is turned on. The clock pin CLK of the D-trigger U2 receives a low level signal. Furthermore, the data input pin D of the D-trigger U2 receives a low level signal, such that the output pin Q of the D-trigger U2 does not output signals. The CPLD 11 receives a high level signal, and makes the PSU 10 keep supplying power to the CPU 20.

When the voltage VCCP from the PSU 10 is greater than the maximum working voltage VCPPmax, the comparator U1 outputs a high level signal. The MOSFET Q1 is turned on. The voltage VCCP is grounded through the MOSFET Q1. The MOSFET Q2 is turned on. The MOSFET Q3 is turned off. The clock pin CLK of the D-trigger U2 receives a high level signal. Furthermore, the data input pin D of the D-trigger U2 receives a low level signal, such that the output pin Q of the D-trigger U2 outputs a low level signal. The CPLD 11 receives a low level signal, and makes the PSU 10 stop supplying power to the CPU 20.

In the embodiment, the MOSFETs Q1-Q3 function as electronic switches.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A power supply circuit, comprising:

a power supply unit (PSU);

a comparator, wherein a positive input of the comparator is connected to the PSU, a negative input of the comparator is connected to a reference voltage;

first to third electronic switches, wherein control terminals of the first and second electronic switches are connected to an output of the comparator, the control terminals of the first and second electronic switches are further connected to a first power supply through a first resistor, a first terminal of the first electronic switch is connected to the PSU and an electronic device, a second terminal of the first electronic switch is grounded, a first terminal of the second electronic switch is connected to the first power supply through a second resistor, a second terminal of the second electronic switch is grounded, a control terminal of the third electronic switch is connected to the first terminal of the second electronic switch;

a D-trigger, wherein a clock pin of the D-trigger is connected to a first terminal of the third electronic switch, and is further connected to a second power supply through a third resistor, a second terminal of the third electronic switch is grounded, a data input pin and a ground pin of the D-trigger are grounded, a power pin of the D-trigger is connected to the second power supply, an output pin of the D-trigger is connected to the second power supply through a fourth resistor; and a complex programmable logic device (CPLD), wherein the output pin of the D-trigger is connected to the CPLD, the CPLD is further connected to the PSU;

wherein when a voltage from the PSU is greater than the reference voltage, the first electronic switch is turned on, the electronic device connected to the first terminal of the first electronic switch does not receive power from the PSU, the second electronic switch is turned on, the third electronic switch is turned off, the output pin of the D-trigger outputs a low level signal, the CPLD controls the PSU to stop supplying power.

2. The power supply circuit of claim 1, wherein the first electronic switch is a metal oxide semiconductor field effect transistor (MOSFET), a gate of the MOSFET is the control terminal of the first electronic switch, a drain of the MOSFET is the first terminal of the first electronic switch, a source of the MOSFET is the second terminal of the first electronic switch.

3. The power supply circuit of claim 1, wherein the second electronic switch is a MOSFET, a gate of the MOSFET is the control terminal of the second electronic switch, a drain of the MOSFET is the first terminal of the second electronic switch, a source of the MOSFET is the second terminal of the second electronic switch.

4. The power supply circuit of claim 1, wherein the third electronic switch is a MOSFET, a gate of the MOSFET is the control terminal of the third electronic switch, a drain of the MOSFET is the first terminal of the third electronic switch, a source of the MOSFET is the second terminal of the third electronic switch.

5. The power supply circuit of claim 1, further comprising fifth and sixth resistors connected in series, wherein the fifth and sixth resistors are connected between the first power supply and ground, the negative input of the comparator is connected to a node between the fifth and sixth resistors for receiving the reference voltage.

6. The power supply circuit of claim 1, wherein the data input pin of the D-trigger is grounded through a seventh resistor.

\* \* \* \* \*